Feb. 14, 1961
E. J. HARTER
2,971,697
ELECTRICAL MEASURING APPARATUS
Filed Aug. 2, 1957
2 Sheets-Sheet 1
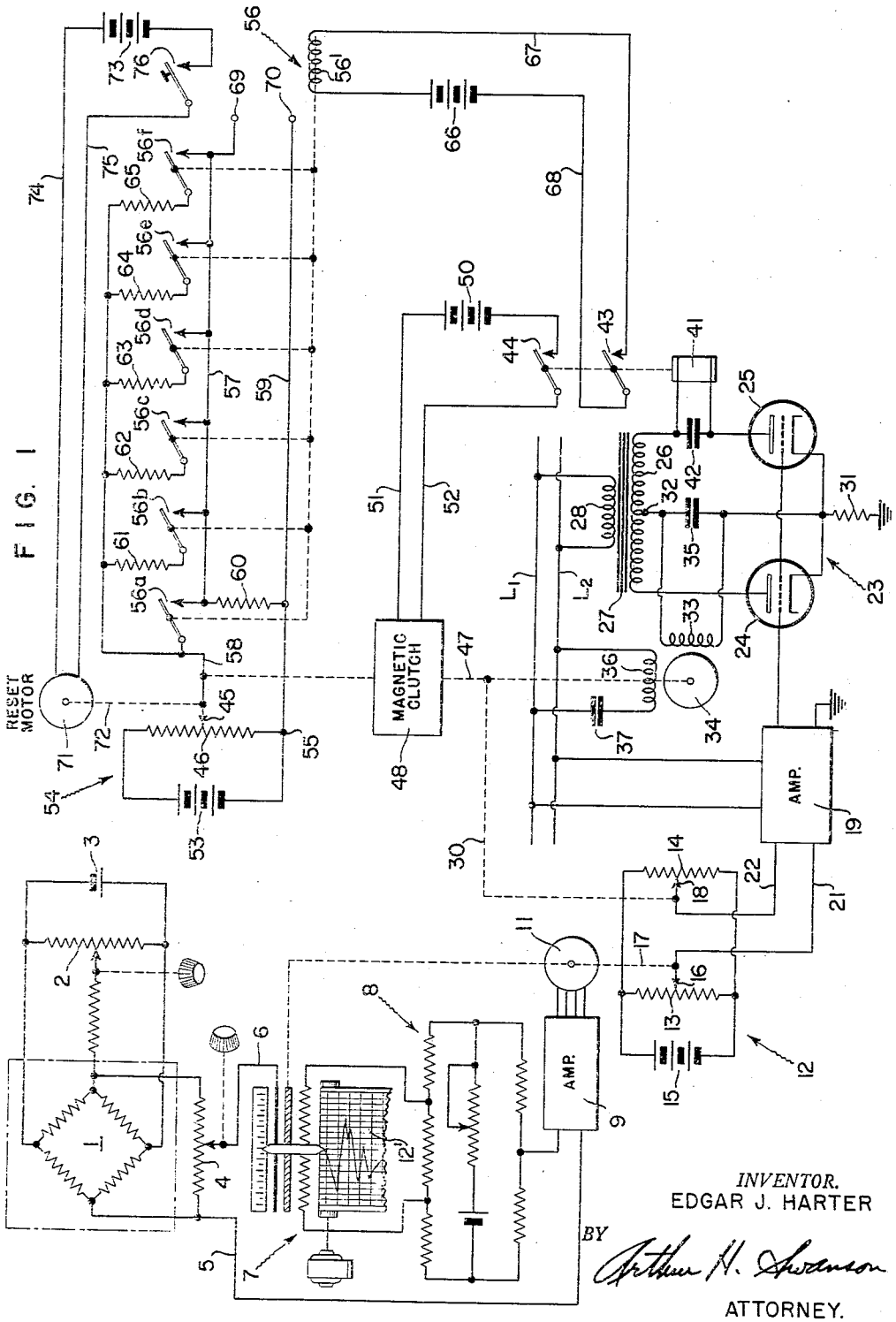
INVENTOR.
EDGAR J. HARTER
BY Arthur H. Swenson
ATTORNEY.

Feb. 14, 1961   E. J. HARTER   2,971,697
ELECTRICAL MEASURING APPARATUS
Filed Aug. 2, 1957   2 Sheets-Sheet 2
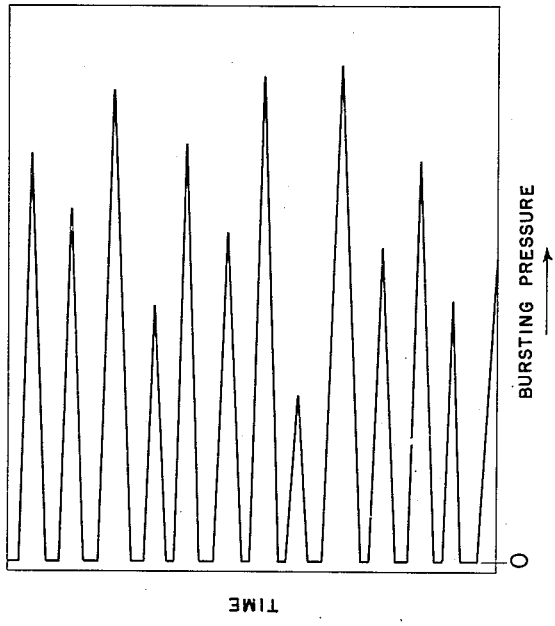
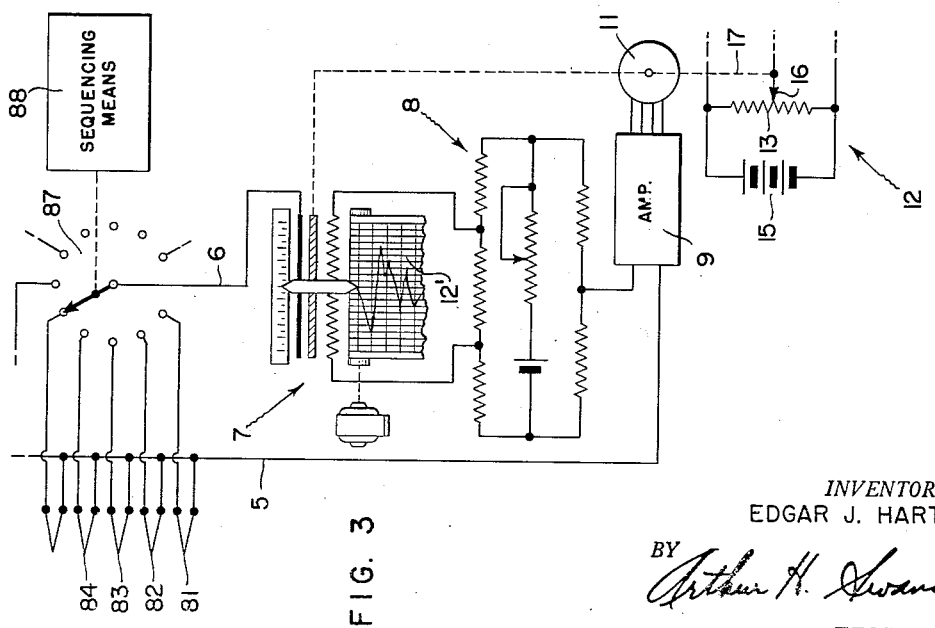
INVENTOR.
EDGAR J. HARTER
BY
ATTORNEY.

United States Patent Office 2,971,697
Patented Feb. 14, 1961

2,971,697
ELECTRICAL MEASURING APPARATUS

Edgar J. Harter, Broomall, Pa., assignor to Minneapolis-Honeywell Regulator Company, Minneapolis, Minn., a corporation of Delaware Filed Aug. 2, 1957, Ser. No. 676,015

10 Claims. (Cl. 235—193)

The present invention generally pertains to electrical measuring apparatus. More specifically, the present invention is concerned with the type of measuring apparatus which is adapted to provide a measure of the average value of the magnitude of a plurality of successively occuring values.

A general object of the present invention is to provide an apparatus for producing a voltage having a magnitude proportional to the average magnitude of a plurality of successively occurring values.

A specific object of the present invention is to provide an apparatus for producing a voltage having a magnitude proportional to the magnitude of a condition subject to successive variations in magnitude.

Another specfic object of the present invention is to provide an apparatus designed to produce a voltage representing the avearge magnitude of the magnitudes of a plurality of conditions.

The present invention has particular utility in connection with an apparatus for performing a Mullen test. The Mullen test provides a measure of the bursting strength of paper or other material. This test is usually made by clamping the paper or other material against a rubber diaphragm which is then subjected to increasing hydraulic pressure until the expanding diaphragm ruptures the paper. The pressure at which the paper ruptures is then a measure of the bursting strength of the paper. A series of such tests is usually performed at spaced intervals across the width or along the length of a roll of paper and the average value of the bursting strength of the roll of paper is provided by averaging the values obtained from the individual tests.

It is a further object of the present invention to provide an apparatus operative to average the values of a series of individual Mullen tests as recorded by a self-balancing potentiometer.

The various objects of the present invention are accomplished by means of a system which provides a balanceable electrical network which is unbalanced to produce a signal proportional to the magnitude of each of the successive variations to be averaged. Rebalancing means are provided for rebalancing this network which are operative to adjust the output of a variable voltage source when the means are rebalancing an unbalance of the network representative of an increase in the magnitude of each of the successive variations to be averaged. Means are also provided, controlled by the rebalancing means, to divide the output of said variable voltage source by the number of variations averaged.

A better understanding of the present invention may be had from the following description read with reference to the accompanying drawings of which:

Fig. 1 is a circuit diagram of a preferred embodiment of the present invention adapted to provide a D.C. voltage proportional to the average value of the magnitude of a condition subject to successive variations in magnitude;

Fig. 2 is a chart showing typical variations in the magnitude of the condition which the apparatus shown in Fig. 1 is adpated to average; and Fig. 3 is a modification of the embodiment of the present invention shown in Fig. 1 which is adapted to provide a D.C. voltage proportional to the average values of the magnitudes of a plurality of variables.

Referring now to Fig. 1, there is shown an embodiment of the present invention adapted to provide a D.C. voltage proportional to the magnitude of the bursting strength of paper as derived from a series of Mullen tests. A strain gauge bridge 1 is subjected, by means not shown, to the pressure applied to the paper by a Mullen tester. The strain gauge bridge 1 is provided with a zero adjusting means 2, connected across a bridge energizing source 3. The output of strain gauge bridge 1 is taken across a span adjusting means 4 and is applied, by means of the conductors 5 and 6, to a self balancing potentiometer 7 of the type disclosed and claimed in the Walter P. Willis Patent 2,423,540 of July 8, 1947. In this potentiometer, the output of the strain gauge bridge 1 unbalances a measuring circuit 8, the unbalance being applied to the input of the amplifier 9. The amplifier 9, in turn, is operative to impress upon a motor 11 a signal, varying in magnitude and phase in accordance with the magnitude and direction of the unbalance, to drive the motor in the direction and to the extent necessary to rebalance the measuring circuit 8. In this manner, the potentiometer 7 is operative to produce on a chart 12' a record of the magnitude of each of the individual Mullen tests. In Fig. 2 there is shown a fragment of a typical chart produced by the potentiometer 7 when recording the results of a series of Mullen tests.

Referring again to Fig. 1, the numeral 12 designates a rebalanceable electrical network in the form of a bridge circuit comprising a pair of slidewire resistors 13 and 14 connected in parallel across a source of bridge energizing current, shown as the battery 15. The slidewire 13 has a sliding contact 16 which is connected to the motor 11 of the self balancing potentiometer 7 by means of a gear train and linkage 17, which is shown diagrammatically by means of a dashed line. Thus, as the motor 11 rebalances the measuring circuit 8 it unbalances the network 12 in accordance with the magnitude of the variations which unbalanced the network 8. The slidewire 14 of the network 12 has a sliding contact 18. Sliding contact 16 of the slidewire 13 and the sliding contact 18 of the slidewire 14 are connected to the input of an amplifier 19 by means of the conductors 21 and 22. The amplifier 19 is a D.C. conversion amplifier which is operative to convert the D.C. unbalance of the electrical network 12 into an alternating current signal, amplify that signal, and impress upon the motor drive circuit 23 a signal varying in magnitude and phase in accordance with the magnitude and direction of the unbalance of the circuit 12. The amplifier 19 and the motor drive circuit 23 are of the type disclosed and claimed in the aforementioned Wills Patent 2,423,540.

The motor drive circuit 23 comprises a pair of triode vacuum tubes 24 and 25 having their anodes connected to the opposite ends of the secondary winding 26 of the transformer 27. The transformer 27 has a primary winding 28 connected across a pair of alternating current conductor $L_1$ and $L_2$. The cathodes of the triodes 24 and 25 are connected together and to ground through a resistor 31. In addition, the cathodes of the triodes 24 and 25 are connected to a center tap 32 of the transformer secondary winding 26 through a control winding 33 of a two phase reversible induction motor 34. The control winding 33 of the induction motor 34 is shunted by a condenser 35. The induction motor 34 has a power phase winding 36 connected across the conductors $L_1$ and $L_2$ through a capacitor 37. The motor 34 is connected to the sliding contact 18 on the slidewire resistor 14 by means of a gear train and linkage 30, shown diagrammatically by means of a dashed line. The grids of the triodes 24 and 25 are connected together to the output of the amplifier 19. As mentioned before, the unbalance signal from the network 12 is converted into an alternating current signal having a magnitude and phase dependent upon the magnitude and direction of the unbalance by the amplifier 19. The operation of the motor drive circuit 23 is such that the plates of the triodes 24 and 25 are alternately rendered positive and negative by the motor drive tube energizing current in the secondary winding 26 of the transformer 27. Accordingly, assuming that in the absence of a signal on the grids of the triodes 24 and 25 neither is conductive, a signal on the grids of the triodes 24 and 25 of one phase will cause one of the tubes to conduct, driving the motor 34 in one direction, and a signal of the opposite phase will cause the other tube to conduct, driving the motor in the opposite direction. It is assumed, for purposes of this explanation, that the phasing of the amplifier 19 and the motor drive circuit 23 that the triode 24 is rendered conductive when the motor 34 is rebalancing the network 12 in response to an unbalance caused by a decreasing pressure as sensed by the strain gauge bridge 1, and that the triode 25 conducts to energize the motor 34 to rebalance the network 12 in response to an unbalance of that network caused by an increasing pressure as sensed by the strain gauge 1. It should be noted, that the plate of the triode 25 is connected to the end terminal of the secondary winding 26 through a relay 41 which is shunted by a capacitor 42. The relay 41 has a pair of contacts 43 and 44. The relay 41 is energized only when the vacuum tube 25 is conductive, and hence it is energized only when the electrical network 12 is being rebalanced for an increase in the pressure sensed by the strain gauge bridge 1.

The motor 34, in addition to positioning the sliding contacts 18 on the slidewire 14, is operative to position a sliding contact 45 on a slidewire 46 by means of a gear train and linkage 47, and a magnetic clutch 48. The magnetic clutch 48 is adapted to be energized from a battery 50 by means of the contact 44 of the relay 41 and a pair of conductors 51 and 52. The slidewire resistor 46 is connected across a battery 53 to provide an adjustable voltage source 54. The output from the adjustable voltage source 54 is between the end terminal 55 of the resistor 46 and the sliding contact 45. The end terminal 55 is connected to one of the circuit output terminals 70 by means of a conductor 59. The sliding contact 45 on the slidewire resistor 46 is adapted to be connected to the other circuit output terminal 69 through the resistors 61, 62, 63, 64, and 65 and the contact pairs 56a, 56b, 56c, 56d, 56e, and 56f of the stepping switch 56. As shown, the stationary ones of the contact pairs 56a through 56f are connected together and to the output terminal 69 by means of a conductor 57. The sliding contact 45 on the slidewire resistor 46 is connected directly to the movable contact of the contact pair 56a by means of a conductor 58 and to the movable ones of the contact pairs 56b through 56f by means of the conductor 58 and the resistors 61 through 65 respectively. The stationary one of the contact pair 56a is connected to the conductor 59 and hence the output terminal 70 by means of a resistor 60. As shown, the stepping switch 56 has an energizing coil 56' which is connected to the battery 66 by means of a conductor 67, the contact 43 of the relay 41, and the conductor 68.

The sliding contact 45 on the slidewire 46 is reset by closing the reset contacts 76. The reset contacts 76 connect a reset motor 71 to the battery 73 through the conductors 74 and 75. The reset motor 71 is connected to the sliding contact 45 on the slidewire resistor 46 by means of a linkage and gear train 72 which is diagrammatically shown by a dashed line. When the motor 71 is resetting the sliding contact 45 of the slidewire resistor 46, it is inoperative to effect the position of the sliding contact 18 on the slidewire 14 due to the presence of the deenergized magnetic clutch 48 in the linkage and gear train connecting the sliding contact 45 with the motor 34.

In operation, the contact pairs 56a to 56f of the stepping switch 56 are sequentially operated each time the coil 56' is energized. As these contacts are closed, the resistors 60 through 65 are connected across the output of the variable voltage source 54. The resistance of the resistors 60 through 65 are proportioned to effect a division of the output of the variable voltage source 54 in accordance with the number of the energizations of the stepping switch 56. Thus, if the resistor 60 has a nominal resistance value R, the resistor 61 also has a resistance value of R. The resistor 62 has a resistance value 2R, the resistor 63 has a resistance value 3R, and so forth, with the resistor 65 having a value 5R.

In considering the operation of the circuit of Fig. 1, it should be noted that the rebalancing action of the motor 11 of the self-balancing potentiometer 7 is proportional to the pressure applied to the strain gauge bridge 1 by the Mullen tester. Since the sliding contact 16 on the slidewire resistor 13 is linked to the motor 11 by means of the gear train and linkage 17, the electrical network 12 is unbalanced in accordance with the pressure applied to the strain gauge bridge 1. The nature of the pressure applied to the strain gauge bridge 1 is such that the pressure increases steadily until the paper being tested bursts. When the paper bursts, the pressure decreases as the tester is made ready to perform a succeeding test. The rebalancing of the electrical network 12 by the rebalancing motor 34 and the associated apparatus is also proportional to the pressure applied to the strain gauge bridge 1. Since the sliding contact 45 on the slidewire resistor 46 of the voltage source 54 is positioned by the rebalancing motor 34, it too is positioned in accordance with the pressure applied to the strain gauge bridge 1. However, the sliding contact 45 is positioned along the resistor 46 only in accordance with increasing pressures applied to the strain gauge bridge 1 due to the action of the magnetic clutch 48. As shown, the magnetic clutch 48 is only energized when the motor 34 is rebalancing an unbalance of the network 12 proportional to an increasing pressure on the strain gauge bridge 1 since it is energized through the contact 44 of the relay 41 in the plate circuit of the vacuum tube 25. When the motor 34 is rebalancing an unbalance of the electrical network 12 responsive to decreasing pressure on the strain gauge bridge 1, the relay 41 is not energized and the contacts 44 are open, deenergizing the magnetic clutch 48. As a result, the slider contact 45 is advanced along the slidewire resistor 46 an amount proportional to the pressure applied to the strain gauge bridge 1 each time such a pressure is applied thereto, thereby increasing the output from the variable voltage source 54 proportionally thereto. The stepping switch 56 is also energized only when an increasing pressure is applied to the strain gauge bridge 1 since it is energized through the contact 43 of the relay 41. Accordingly, the output of the variable voltage source 54 is automatically divided by the number of the pressures successively applied to the strain gauge bridge 1 to produce across the circuit output terminals 69 and 70 a D.C. voltage proportional to the average value of the magnitudes of such pressures.

While the apparatus as shown in Fig. 1 is adapted to provide D.C. voltage proportional to the average value of six successively occurring conditions, it should be understood that the stepping switch 56 can have any number of contacts and thus the apparatus can be adapted to provide an average of a greater or lesser number of successively occurring conditions. When one averaging operation is completed, the reset contacts 76 can be closed, energizing the reset motor 71 to drive the slider contact 45 on the slidewire resistor 46 to its zero position, thus readying the apparatus for another averaging operation.

Referring now to Fig. 3, there is shown a modification of the present invention which is adapted to provide a D.C. voltage proportional to the average values of the magnitudes of a plurality of conditions as sensed by a plurality of thermocouples. Similar reference characters have been employed to designate components shown in Fig. 1. Since the operation of these components has already been described, the discussion of their operation will not be repeated. The numerals 81 through 84 designate four of a plurality of thermocouples, responsive to various temperature conditions, that are connected through a stepping switch 87 to an input of the self-balancing potentiometer 7 by means of the conductors 5 and 6. The stepping switch 87 is advanced by a sequencing means 88. Each time the sequencing switch 87 is advanced, the output of another thermocouple is applied to the input of self-balancing potentiometer 7. The potentiometer 7 is operative through the motor 11 to rebalance the measuring circuit 8 in accordance with the output of the thermocouple connected thereto. Accordingly, the electrical network 12 is unbalanced according to the output of each of the thermocouples connected to the input of the potentiometer 7. In this manner, the apparatus of the present invention is operative to provide a D.C. voltage proportional to the average value of the magnitudes of each of the conditions sensed by the thermocouples sequentially connected to the input of the potentiometer 7.

While the present invention has been described and illustrated by means of the specific embodiments shown, it will be obvious that various changes and modifications may be made therein without departing from the spirit of the present invention which should be limited only by the scope of the appended claims.

Having now described the present invention, what is claimed as new and that which it is desired to secure by Letters Patent is:

1. An apparatus for providing a voltage of a magnitude proportional to the average magnitude of a signal whose magnitude is subject to successive variations comprising, in combination, a balanceable electrical network unbalanced to produce said signal, rebalancing means for said network, a variable voltage source, means connecting said rebalancing means to said voltage source to successively increase the output of said source in accordance with the maximum magnitudes of said successive variations, and means responsive to said successive variations for dividing the voltage from said source by the number of said successive variations to provide a voltage of said average value.

2. Apparatus as specified in claim 1 wherein the magnitude of said signal represents the magnitude of a condition subject to successive variations in magnitude.

3. Apparatus as specified in claim 1 wherein said signal represents the magnitudes of a plurality of conditions.

4. An apparatus for providing an electrical signal having a magnitude proportional to the average magnitude of a condition subject to successive variations comprising, in combination, a balanceable electrical network, means responsive to said condition for unbalancing said network, rebalancing means for rebalancing said network, an adjustable signal source, means responsive to the said rebalancing means, when said rebalancing means is rebalancing an unbalance of said network representative of an increase in the magnitude of a successive variation in said condition to increase the output of said source, and means connected to said source and controlled by said last named means to divide the output of said source by the number of said variations.

5. An apparatus for providing an electrical signal having a magnitude proportional to the average magnitude of a condition subject to successive variations comprising, in combination, an electrical bridge circuit, means responsive to said condition for unbalancing said bridge circuit, an electro-mechanical rebalancing means for said bridge circuit, an adjustable voltage source, means driven by said rebalancing means, when said rebalancing means is balancing an unbalance of said bridge circuit representative of an increase in the magnitude of a successive variation in said condition, to increase the output of said source, and means connected to said source and controlled by said rebalancing means to divide the output of said source by the number of said variations each time the magnitude of said condition increases.

6. An apparatus for producing a voltage having a magnitude proportional to the average magnitude of a condition subject to successive variations comprising, in combination, an electrical bridge circuit, means responsive to said condition for unbalancing said bridge circuit, an electro-mechanical rebalancing means for said bridge circuit, a mechanically adjustable voltage source connected to said rebalancing means, said rebalancing means being adapted, when balancing an unbalance of said bridge circuit representative of an increase in the magnitude of a successive variation in said condition, to increase the output of said source, and voltage dividing means connected to said source and controlled by said rebalancing means to divide the output of said source by the number of said variations each time the magnitude of said condition increases.

7. An apparatus for producing a voltage having a magnitude proportional to the average magnitude of a condition subject to successive variations comprising, in combination, a balanceable electrical network, means responsive to said condition for unbalancing said network, rebalancing means for rebalancing said network, an adjustable voltage source, means responsive to the said rebalancing means only when said rebalancing means is rebalancing an unbalance of said network representative of an increase in the magnitude of a successive variation in said condition to increase the output of said source in proportion to said increases, and resistive voltage dividing means connected across said source and controlled by said last named means to divide the output of said source by the number of said variations.

8. An apparatus for producing a voltage having a magnitude proportional to the average magnitude of a condition subject to successive variations comprising, in combination, an electrical bridge circuit, means responsive to said condition for unbalancing said bridge circuit, an electro-mechanical rebalancing means for said bridge circuit, a mechanically adjustable voltage source, means driven by said rebalancing means to adjust the output of said source, said means including a magnetic clutch, means for energizing said clutch only when said rebalancing means is balancing an unbalance of said bridge circuit representative of an increase in the magnitude of a successive variation in said condition, and voltage dividing means connected to said source and controlled by said rebalancing means to divide the output of said source by the number of said variations each time the magnitude of said condition increases.

9. An apparatus for producing a voltage having a magnitude proportional to the average magnitude of a condition subject to successive variations comprising, in combination, an electrical bridge circuit, means responsive to said condition for unbalancing said bridge circuit, an electro-mechanical rebalancing means for said bridge circuit, a mechanically adjustable voltage source, means driven by said rebalancing means to adjust the output of said source, said means including a magnetic clutch, means for energizing said clutch only when said rebalancing means is balancing an unbalance of said bridge circuit representative of an increase in the magnitude of a successive variation in said condition, and voltage dividing means connected to said source and energized only when said rebalancing means is balancing an unbalance of said bridge circuit representative of an increase in the magnitude of a successive variation in said condition to divide the output of said source by the number of said variations each time the magnitude of said condition increases.

10. An apparatus for producing a voltage having a magnitude proportional to the average of the magnitudes of a plurality of conditions comprising, in combination, an electrical bridge circuit, means sequentially responsive to each of said plurality of conditions for sequentially unbalancing said bridge circuit, electro-mechanical rebalancing means for said bridge circuit, a mechanically adjustable voltage source, means driven by said rebalancing means to adjust the output of said source, said means including a magnetic clutch, means for energizing said clutch only when said rebalancing means is balancing an unbalance of said bridge circuit representative of an increase in the magnitude of one of said plurality of conditions, and voltage dividing means connected to said source and controlled by said rebalancing means to divide the output of said source by the number of said plurality of conditions averaged.

References Cited in the file of this patent

UNITED STATES PATENTS 2,872,807     Kilisch _____ Feb. 10, 1959